United States Patent
DeLuca et al.

(10) Patent No.: US 9,911,260 B2
(45) Date of Patent: Mar. 6, 2018

(54) ASSOCIATING EXTERNAL CREDENTIALS WITH MOBILE DEVICES

(71) Applicant: International Business Machines Corporation, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/190,696

(22) Filed: Jun. 23, 2016

(65) Prior Publication Data
US 2017/0372545 A1    Dec. 28, 2017

(51) Int. Cl.
*H04W 4/04* (2009.01)
*G07C 9/00* (2006.01)

(52) U.S. Cl.
CPC .......... *G07C 9/00119* (2013.01); *H04W 4/04* (2013.01)

(58) Field of Classification Search
CPC ..... H04W 4/206; H04W 64/00; H04W 88/02; H04W 4/02; H04W 4/021; H04L 67/22; H04L 67/18; H04L 51/32; G06Q 50/01; G06Q 30/0205; G06Q 30/0261
See application file for complete search history.

(56) References Cited

U.S. PATENT DOCUMENTS

| | | | |
|---|---|---|---|
| 7,044,362 B2 | 5/2006 | Yu | |
| 2008/0288355 A1* | 11/2008 | Rosen | G06F 17/3087 705/14.64 |
| 2011/0082747 A1* | 4/2011 | Khan | G06Q 10/00 705/14.58 |
| 2015/0014412 A1 | 1/2015 | Sulavik et al. | |
| 2015/0051928 A1 | 2/2015 | Gibson et al. | |
| 2015/0081346 A1 | 3/2015 | Charles | |
| 2015/0142483 A1 | 5/2015 | Bergdale et al. | |
| 2016/0080390 A1* | 3/2016 | Kalb | H04W 12/08 726/4 |

FOREIGN PATENT DOCUMENTS

EP    2568422 A1    3/2013

OTHER PUBLICATIONS

Bao, Feng, "A Scheme of Digital Ticket for Personal Trusted Device", pp. 3065-3069, 0-7803-8523-3/04, © 2004 IEEE.

(Continued)

*Primary Examiner* — Nizar Sivji
(74) *Attorney, Agent, or Firm* — Steven Lee Fisher-Stawinski; Aaron N. Pontikos

(57) ABSTRACT

A computer-implemented method includes monitoring one or more mobile devices within a venue. The computer-implemented method further includes receiving a scan event indication denoting a scan of a ticket by a scanning device. The computer-implemented method further includes, responsive to receiving a scan event indication, identifying a candidate list, wherein the candidate list includes one or more candidate mobile devices that are within a threshold distance of the scanning device. The computer-implemented method further includes associating the ticket with at least one of the one or more candidate mobile devices. A corresponding computer system and computer program product are also disclosed.

20 Claims, 3 Drawing Sheets

(56) References Cited

OTHER PUBLICATIONS

"How to Transfer Tickets to a Friend From a Mobile Device", Brown Paper Tickets, 3 pages, printed on Apr. 20, 2016, <https://web.archive.org/web/20150905094726/http://brownpapertickets.com/help/how-to-transfer-tickets-to-a-friend-from-a-mobile-device/>.

"Mobile ticketing", From Wikipedia, the free encyclopedia, 4 pages, printed on Apr. 21, 2016, <https://en.wikipedia.org/wiki/Mobile_ticketing>.

* cited by examiner

ASSOCIATING EXTERNAL CREDENTIALS WITH MOBILE DEVICES

BACKGROUND

The present disclosure relates generally to monitoring mobile devices and in particular to associating external credentials with mobile devices.

The Internet of Things ("IoT") is a network of physical objects or "things" embedded with electronics, software, sensors, and network connectivity, which enable these objects to collect and exchange data between devices and often with reference to the IoT-enabled objects' positioning in an electronic model of a physical environment. The IoT allows objects to be sensed and controlled remotely across existing network infrastructure, creating opportunities for more direct integration between the physical world and computer-based systems. By interacting with IoT systems, mobile devices are able to provide rich feedback regarding external credentials for the physical spatial environment in which the IoT devices and/or systems are installed.

SUMMARY

A computer-implemented method includes monitoring one or more mobile devices within a venue. The computer-implemented method further includes receiving a scan event indication denoting a scan of a ticket by a scanning device. The computer-implemented method further includes, responsive to receiving a scan event indication, identifying a candidate list, wherein the candidate list includes one or more candidate mobile devices that are within a threshold distance of the scanning device. The computer-implemented method further includes associating the ticket with at least one of the one or more candidate mobile devices. A corresponding computer system and computer program product are also disclosed.

DETAILED DESCRIPTION

Within the realm of the Internet of Things "IoT", the use of location detection technologies (e.g., Global Positioning System ("GPS"), Bluetooth®, Bluetooth® low energy ("BLE"), Near Field Communication ("NFC"), Cell Tower Triangulation, Wi-Fi Positioning System ("WPS") have become a practical solution for various venues (e.g., brick and mortar retail stores, airports, stadiums, hospitals, etc.) to enhance the in-venue customer experience, as well as gather valuable insight about consumer preferences. As such, businesses spend a considerable amount of time, money and resources to analyze customers' experiences, preferences, patterns, etc. while present at a venue. In order to gather information about a customer at a venue, businesses utilize location detection technologies to detect and gather real-time information (e.g., monitor presence and track movement) of a mobile device possessed by the customer. By tracking the movement of mobile devices at a venue, a business can analyze details such as the average number of devices in a zone at any specified time, how long the devices are present in a particular zone at a specified time, the path of the devices through the venue, etc.

However, the inventors have observed and/or recognized that venue operators may improve customer satisfaction, and thus generate increased revenue, by producing highly targeted analytics based on the area, zone, seat, etc. assigned to a customer. The inventors have further observed and/or recognized that, in an event setting, where paper tickets are used to gain admittance to a venue, it would be desirable to associate a paper ticket with a mobile device. The inventors have further observed and/or recognized that, by associating paper tickets with mobile devices, a venue operator may gather further information including, but not limited to: how long customers spend in their assigned area, zone, seat, etc., where customers first go upon entrance of a venue, whether customers have trouble finding their seats, and whether customers are properly situated in their assigned area, zone, seat, etc.

Various embodiments of the present invention may address or improve upon some or all of the aforementioned problems or disadvantages, however it will be understood that addressing any particular problem or disadvantage is not a necessary requirement for the practice of all embodiments of the present invention.

Figure 1:
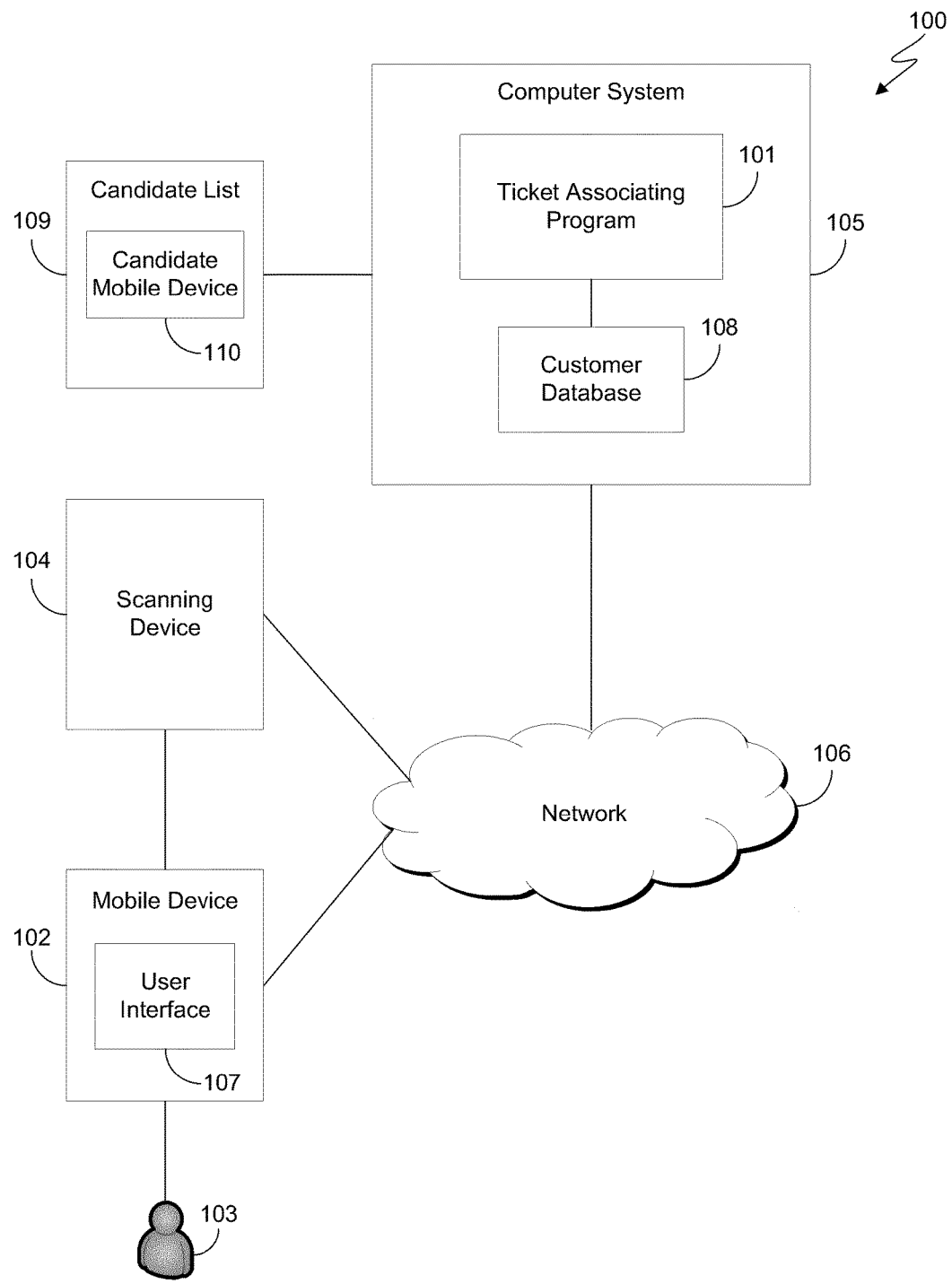
FIG. 1 is a functional block diagram of a distributed data processing environment suitable for operation of a ticket associating program in accordance with at least one embodiment of the invention.

Referring now to various embodiments of the invention in more detail, FIG. 1 is a functional block diagram of a computing environment, generally designated 100, suitable for operation of a ticket associating program in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes one or more mobile devices 102, one or more users 103, scanning device 104, and computer system 105, interconnected over network 106. Network 106 can be, for example, a telecommunications network, a local area network (LAN), a wide area network (WAN), such as the Internet, or a combination of the three, and can include wired, wireless, or fiber optic connections. Network 106 may include one or more wired and/or wireless networks that are capable of receiving and transmitting data, voice, and/or video signals, including multimedia signals that include voice, data, and video information. In general, network 106 may be any combination of connections and protocols that will support communications between one or more mobile devices 102, scanning device 104, computer system 105, and other computing devices (not shown) within computing environment 100.

Mobile device 102 may be a laptop computer, tablet computer, smartphone, smartwatch, or any programmable electronic device capable of communicating with various components and devices within computing environment 100, via network 106. In general, mobile device 102 represents any programmable electronic device or combination of programmable electronic devices capable of executing machine readable program instructions and communicating with other computing devices (not shown) within computing environment 100 via a network, such as network 105. Mobile device 102 includes user interface 107.

User interface 107 provides an interface between user 103 of mobile device 102 and computer system 105. In one embodiment, user interface 107 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 107 may also be mobile application software that provides an interface between user 103 of mobile device 102 and computer system 105. Mobile application software, or an "app," is a computer program that runs on smartphones, tablet computers, smartwatches and any other mobile devices. User interface 107 enables user 103 to provide login credentials to access an "app" associated with a venue on mobile device 102.

Computer system 105 can be a standalone computing device, a management server, a web server, a mobile computing device, or any other electronic device or computing system capable of receiving, sending, and processing data. In other embodiments, computer system 105 can represent a server computing system utilizing multiple computers as a server system, such as in a cloud computing environment. In an embodiment, computer system 105 represents a computing system utilizing clustered computers and components (e.g., database server computers, application server computers, etc.) that act as a single pool of seamless resources when accessed within computing environment 100. Computer system 105 includes ticket associating program 101 and customer database 108 communicatively coupled to computer system 105. Although customer database is depicted in FIG. 1 as being integrated with computer system 105, in some embodiments, customer database 108 may be remotely located from computer system 105. Computer system 105 may include internal and external hardware components, as depicted and described in further detail with respect to FIG. 3.

Generally, customer database 108 may store information about a ticket that is associated with mobile device 102, as well as location data associated with mobile device 102 at a venue. More specifically, customer database 108 may store information about user 103 having mobile device 102 with an "app" that is associated with a venue. For example, customer information may include user's 103 phone number, email address, social security number ("SSN"), financial account information, physical address, as well as information about the name and/or username linked to mobile device 102 and/or an app associated with a venue.

Figure 2:
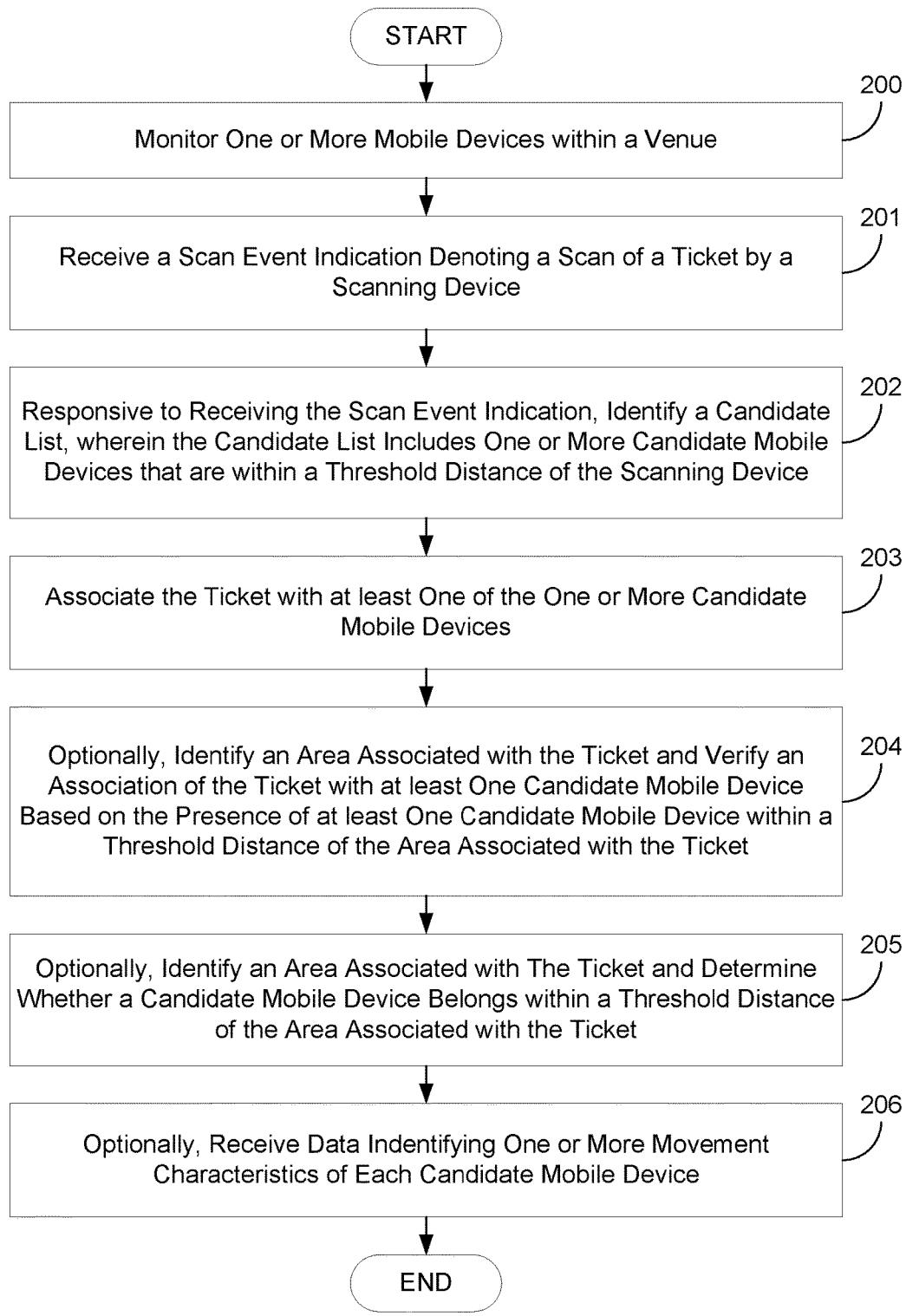
FIG. 2 is a flow chart diagram depicting operational steps for a ticket associating program in accordance with at least one embodiment of the invention.

FIG. 2 is a flow chart diagram depicting operational steps for a ticket associating program in accordance with at least one embodiment of the invention. At step 200, ticket associating program 101 may monitor one or more mobile devices 102 within a venue. More specifically, ticket associating program 101 may monitor the location of mobile devices 102. A venue may be understood generally as any physical location in which an individual may traverse and more specifically, as a physically defined location (e.g., merchant, store, hospital, airport, stadium, etc.). Furthermore, the venue may include one or more designated areas or zones (e.g., a stadium may have concession stands, souvenir stands, restrooms, as well as designated seating zones etc.). Each designated seating zone may further be divided (e.g., by floor level, isle number, row number, seat number, etc.).

In an embodiment of the invention, ticket associating program 101 may monitor the location of a mobile device 102 by being in direct communication with mobile device 102. Here, mobile device 102 may detect its own location (e.g., via "GPS") and transmit the location data to ticket associating program 101. In an embodiment of the invention, ticket associating program 101 may monitor the location of mobile device 102 by a cell tower triangulation system.

In an embodiment of the invention, ticket associating program 101 may monitor the location of mobile device 102 through a "WPS" via network 106. A "WPS" may be used where GPS is inadequate due to signal blockage indoors. Here, any mobile device enabled for Wi-Fi communication that is based on the 802.11 protocol may be detected by Wi-Fi independent access points (e.g., proximity sensors or networks of access points that are distributed throughout defined areas of a venue). For example, a "WPS" may determine the distance between mobile device 102 and a network of access points by measuring the intensity of the received signal (i.e., received signal strength indication or "RSSI") between mobile device 102 and each access point. With the known distances between mobile device 102 and the access points, signal triangulation algorithms may determine the position of mobile device 102.

In an embodiment of the invention, ticket associating program 101 may monitor the location of mobile device 102 through a Bluetooth® based positioning system consisting of BLE beacon transmitting devices (e.g., iBeacon®, Estimote®, Nomi®, etc.). These beacon transmitting devices broadcast a wireless signal to nearby mobile devices 102 (e.g., smart phones, smart watches, tablets, etc.) that have an app or operating system that is compatible with the beacon transmitting device. The combination of a beacon transmitting device and a compatible app or operating system enables mobile device 102 to perform actions when in close proximity to a beacon transmitting device. More specifically, beacon transmitting devices use BLE proximity sensing to transmit a universally unique identifier picked up by the compatible app or operating system. The identifier and several bytes of information sent with it can be used to determine the physical location of mobile device 102.

In an embodiment of the invention, ticket associating program 101 may monitor the location of mobile device 102 by receiving a wireless Bluetooth signal from mobile device 102. Here, mobile device 102 is capable of emitting a Bluetooth signal by means of having an app or operating system that is capable of emitting a Bluetooth signal. For example, the iPhone® may be configured to act as a Bluetooth signal transmitter. Any iPhone® model 4S or later that runs on an iPhone® Operating System 7 (iOS7) or later can be configured to act as a Bluetooth signal transmitter using any generally known apps that are compatible with iOS7, such as the GemTOT for iOS open source app. In another example, any mobile device that has BLE hardware, the peripheral mode enabled by the device manufacture, and runs on an Android® 5.0 operating system or later can be configured to act as a beacon signal transmitter using any generally known apps that are compatible with Android® 5.0, such as QuickBeacon app.

At step 201, ticket associating program 101 may receive a scan event indication denoting a scan of a ticket by a scanning device 104. More specifically, the ticket may be a non-digital ticket (i.e., paper ticket). Furthermore, the ticket may denote a credential (i.e., documentation or secret knowledge (e.g., a password or key) to control access to information or a location) for access to a venue. For example, ticket associating program 101 may authenticate a ticket possessed by user 103 of mobile device 102 by comparing the credentials denoted by the ticket to those credentials stored in a database. If the credentials match, then ticket associating program 101 may grant user 103 of mobile device 102 access to the venue by sending a wireless signal to event scanner indicating authorization for access to the venue has been confirmed. In an embodiment of the invention, scanning device 104 may be a stationary device (e.g., desktop-barcode scanner, desktop-quick response ("QR") code scanner, etc.). In an embodiment of the invention, scanning device 104 may be a mobile scanning device (e.g., smartphone, tablet computer, or any other mobile device that is programmed to authenticate tickets through an installed software application) operated by an employee of a venue. In either embodiment, scanning device 104 is capable of reading any generally known machine-readable encoding technologies utilized by a paper ticket. For example, scanning device 104 may read a barcode present on a paper ticket. In another example, scanning device 104 may read a QR code present on a paper ticket. In yet a further example, scanning device 104 may utilize optical character recognition (i.e., optical character reader or "OCR") to convert images of typed, handwritten or printed text present on a paper ticket into machine-encoded text to be search and validate a paper ticket.

At step 202, responsive to receiving a scan event indication, ticket associating program 101 may identify a candidate list 109. More specifically, candidate list 109 includes one or more candidate mobile devices 110 that are within a threshold distance of scanning device 104. Here, ticket associating program 101 is constantly monitoring the location of mobile devices 102 by any of the previously mentioned location detection methods. Moreover, ticket associating program 101 may be in direct communication with scanning device 104, wherein scanning device 104 may detect its own location (e.g., via "GPS") and transmit the location data to ticket associating program 101. With the known locations of scanning device 104 and mobile devices 103 at a venue, ticket associating program 101 may identify one or more candidate mobile devices 110 that are with a threshold distance (e.g., three feet) of the location of scanning device 104 at the time a ticket is scanned.

At step 203, ticket associating program 101 may associate the ticket with at least one candidate mobile device 110. For example, a number of people having mobile device 103 may be waiting in line to gain admittance to an event at a venue. Upon scanning a ticket, ticket associating program 101 will receive a scan event indication denoting that a ticket has been scanned. Upon receiving the scan event indication, ticket associating program 101 may identify a candidate list 109 including a first candidate mobile device 110, a second candidate mobile 110 device, and a third candidate mobile device 110 within the defined threshold distance (e.g., 5 feet) of scanning device 104. Accordingly, ticket associating program 101 will associate the ticket with the first, second, and third candidate mobile devices 110.

Optionally, at step 204, associating the ticket with at least one candidate mobile device 110 includes identifying an area (e.g., zone, isle, row, seat, etc.) associated with the ticket. For example, ticket associating program 101 may associate a ticket having the seating designation "zone 325, row 19, seat 7" with the first, second and third candidate mobile devices 110. At step 204, associating the ticket with at least one candidate mobile device 110 may further include verifying an association of the ticket with at least one candidate mobile device 110 based on the presence of at least one candidate mobile device 110 within a threshold distance of the area associated with the ticket. For example, ticket associating program 101 may monitor the location of the first, second, and third candidate mobile devices 110 to determine whether any of these candidate mobile devices are present within a threshold distance (e.g., ten feet) of the associated ticket having the seating designation "zone 325, row 19, seat 7". Thus, a threshold distance of ten feet from "zone 325, row 19, and seat 7" may include, for example, seats 1-10 in rows 19, 20, and 21 within zone 325. If only the first candidate mobile device 110 is present within ten feet of "zone 325, row 19, seat 7," then ticket associating program 101 may verify that only the first candidate mobile device 110 should be associated with the ticket. However, if all three candidate mobile devices 110 are present within ten feet of "zone 325, row 19, seat 7," then ticket associating program 101 may generally verify that the ticket should be associated with all three candidate mobile devices 110.

Optionally, at step 205, ticket associating program 101 may identify an area associated with the ticket. For example, ticket associating program 101 may identify the area "zone 125, rows 1-5, wherein each row includes seats 1-20. Furthermore, at step 205, ticket associating program 101 may determine whether a candidate mobile device 110 belongs within a threshold distance of the area associated with the ticket. For example, candidate mobile device #1 (associated with the seating designation "zone 325, row 19, seat 7") is currently located in zone 125, row 3, and seat 17. Here, ticket associating program 101 may determine that candidate mobile device #1 110 (associated with the seating designation "zone 325, row 3, seat 17") does not belong in zone 125, row 3, seat 17. Accordingly, ticket associating program 101 may alert an usher that candidate mobile device #1 is in the incorrect seat. Similarly, ticket associating program 101 may send a notification to candidate mobile device #1 (e.g., via text message, push notification, etc.) to indicate that candidate mobile device #1 is located in the incorrect seat. In some embodiments, the notification includes an indication of the correct seat. In some instances, the correct seat in relation to the incorrect seat is also provided in the notification, e.g., a map showing the relative positions of the two seats and a pathway to travel from one to the other.

Optionally, at step 206, ticket associating program 101 may receive data identifying one or more movement characteristics of each candidate mobile device 110. Generally, the one or more movement characteristics may identify a path travelled by each candidate mobile device 110 associated with a ticket through a venue. More specifically, the one or more movement characteristics may be understood as characteristics of any movement or lack thereof by each candidate mobile device 110 within a venue that may prompt a device (e.g., candidate mobile device 110, BLE beacon transmitting device, etc.) to transmit data to ticket associating program 101. Types of movement characteristics at a venue may include, but are not limited to entering an area, exiting an area, and item transactions (e.g., purchasing an item, scanning an item, etc.).

In an embodiment of the invention, ticket associating program 101 may determine at least one of the time and the total amount of time each candidate device 110 is located within the threshold distance of the area associated with the ticket. In an embodiment of the invention, ticket associating program 101 may determine a sentiment based on identifying one or more movement characteristics of each candidate mobile device 110 during a time of an activity associated with the non-digital ticket. For example, candidate mobile device #2 and candidate mobile device #3 may be associated with a ticket at a venue (e.g., a movie theatre). During movie "BB" shown in theatre "B", ticket associating program 101 may identify the movement characteristics "candidate mobile device #2 exited theatre "B", candidate mobile device #2 entered concession area, and candidate mobile device #2 entered theatre "B". Here, a neutral or positive sentiment information may be determined based on the return of candidate mobile device #2 to theatre "B" after purchasing concessions. On the other hand, ticket associating program 101 may identify the movement characteristics "candidate mobile device #3 exited theatre "B" twenty minutes into the movie and candidate mobile device #3 exited the movie theatre. Here, ticket associating program 101 may determine a negative sentiment with regard to movie BB associated with the ticket. One skilled in the art would recognize that various thresholds and analysis may be applied to determine whether the existence of a given movement characteristic indicates a positive, negative, or neutral sentiment. Such sentiments, may then be used for further analysis. For example, the determination of a rating for the movie that was playing in theatre "B". Further, some embodiments may leverage this data to make recommendations to various users, for example, the managers of theatre "B" and movie patrons.

Figure 3:
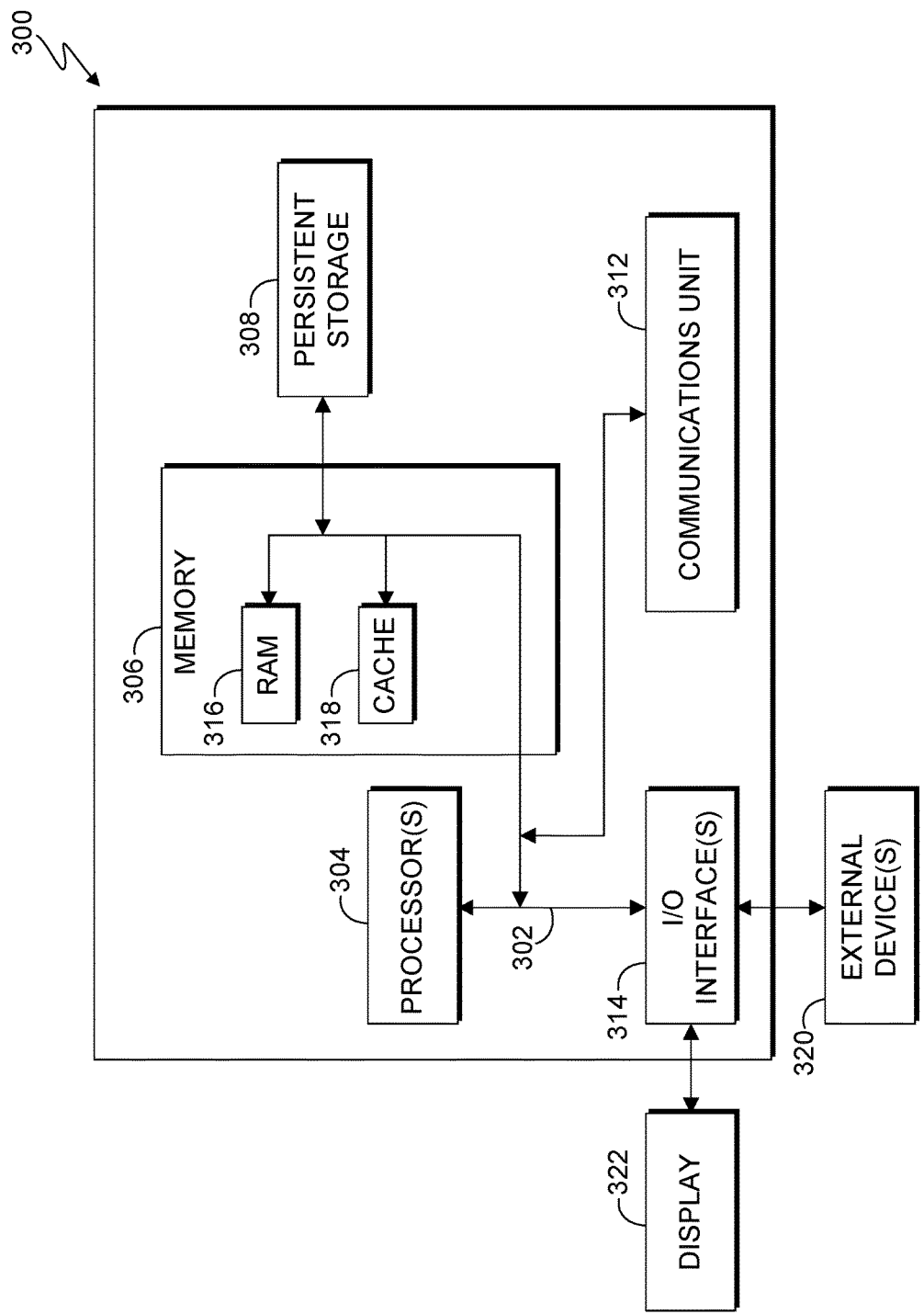
FIG. 3 is a block diagram depicting components of a computer suitable for executing a ticket associating program in accordance with at least one embodiment of the invention.

FIG. 3 is a block diagram depicting components of a computer 300 suitable for executing the ticket associating program 101, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for the ticket associating program 101 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving a scan event from a first device at a first location of a venue, wherein said scan event denotes authentication of a paper ticket possessed by a customer with a mobile device and grants the customer access to said venue, wherein said mobile device is unassociated with said paper ticket prior to said scan;
    responsive to receiving said scan event, generating an association between said mobile device of the customer and a location indicated by said paper ticket by:
        identifying said mobile device based, at least in part, on said mobile device being within a threshold distance of said first location of said first device at a time said paper ticket is scanned; and
        creating said association between said paper ticket and said mobile device based, at least in part, on said mobile device being within said threshold distance of said first location; and
    responsive to said generation of said association between said mobile device of said customer and said location indicated by said paper ticket, generating a movement characteristic for said customer by tracking changes in said location of said mobile device.

2. The computer-implemented method of claim 1, further comprising:

identifying a presence of said mobile device within an area of said venue; and determining said mobile device does not belong within said area of said venue based, at least in part, on said location indicated by said ticket.

3. The computer-implemented method of claim 1, further comprising receiving data identifying one or more movement characteristics of said mobile device through said venue.

4. The computer-implemented method of claim 3, further comprising determining a path of said mobile device based on said one or more movement characteristics of said mobile device through said venue.

5. The computer-implemented method of claim 3, further comprising:
determining a sentiment based on identifying said one or more movement characteristics of said mobile device during a time of an activity associated with said paper ticket.

6. The computer-implemented method of claim 1, wherein said paper ticket is a non-digital ticket.

7. The computer-implemented method of claim 1, wherein said paper ticket denotes a credential for access to said venue.

8. A computer program product, said computer program product comprising one or more computer readable storage media and program instructions stored on said one or more computer readable storage media, said program instructions comprising instructions to:
receive a scan event from a first device at a first location of a venue, wherein said scan event denotes authentication of a paper ticket possessed by a customer with a mobile device and grants the customer access to said venue, wherein said mobile device is unassociated with said paper ticket prior to said scan;
responsive to receiving said scan event, generate an association between said mobile device of the customer and a location indicated by said paper ticket by:
identifying said mobile device based, at least in part, on said mobile device being within a threshold distance of said first location of said first device at a time said paper ticket is scanned; and
creating said association between said paper ticket and said mobile device based, at least in part, on said mobile device being within said threshold distance of said first location; and
responsive to said generation of said association between said mobile device of said customer and said location indicated by said paper ticket, generate a movement characteristic for said customer by tracking changes in said location of said mobile device.

9. The computer program product of claim 8, further comprising program instructions to:
identify a presence of said mobile device within an area of said venue; and
determine said mobile device does not belong within said area of said venue based, at least in part, on said location indicated by said ticket.

10. The computer program product of claim 8, further comprising program instructions to receive data identifying one or more movement characteristics of said mobile device through said venue.

11. The computer program product of claim 10, further comprising program instructions to determine a path of said mobile device based on said one or more movement characteristics of said mobile device through said venue.

12. The computer program product of claim 10, further comprising program instructions to:
determine a sentiment based on identifying said one or more movement characteristics of said mobile device during a time of an activity associated with said paper ticket.

13. The computer program product of claim 8, wherein said paper ticket is a non-digital ticket.

14. The computer program product of claim 8, wherein said paper ticket denotes a credential for access to said venue.

15. A computer system, the computer system comprising:
one or more computer processors;
one or more computer readable storage media;
computer program instructions;
said computer program instructions being stored on said one or more computer readable storage media;
said computer program instructions comprising instructions to:
receive a scan event from a first device at a first location of a venue, wherein said scan event denotes authentication of a paper of a ticket possessed by a customer with a mobile device and grants the customer access to said venue, wherein said mobile device is unassociated with said paper ticket prior to said scan;
responsive to receiving said scan event, generate an association between said mobile device of the customer and a location indicated by said paper ticket by:
identifying said mobile device based, at least in part, on said mobile device being within a threshold distance of said first location of said first device at a time said paper ticket is scanned; and
creating said association between said paper ticket and said mobile device based, at least in part, on said mobile device being within said threshold distance of said first location; and
responsive to said generation of said association between said mobile device of said customer and said location indicated by said paper ticket, generate a movement characteristic for said customer by tracking changes in said location of said mobile device.

16. The computer system of claim 15, further comprising program instructions to:
identify a presence of said second device within a threshold distance of a third location within said venue; and
determine said second device does not belong within said threshold distance of said third location within said venue.

17. The computer system of claim 15, further comprising program instructions to receive data identifying one or more movement characteristics of said second device through said venue.

18. The computer system of claim 17, further comprising program instructions to determine a path of said second device based on said one or more movement characteristics of said second device through said venue.

19. The computer system of claim 17, further comprising program instructions to:
determine a sentiment based on identifying said one or more movement characteristics of said second device during a time of an activity associated with said paper ticket.

20. The computer system of claim 15, wherein said paper ticket is a non-digital ticket.

\* \* \* \* \*